Sept. 20, 1955     H. BRINKMANN     2,718,440
CAGE FOR AXIALLY LOADED ANTI-FRICTION BEARINGS
Filed Feb. 4, 1954     2 Sheets-Sheet 1

INVENTOR
Heinrich Brinkmann

INVENTOR:
Heinrich Brinkmann
By Wallin Parker
Patent Agent

United States Patent Office
2,718,440
Patented Sept. 20, 1955

2,718,440
CAGE FOR AXIALLY LOADED ANTI-FRICTION BEARINGS

Heinrich Brinkmann, Hamburg-Bahrenfeld, Germany

Application February 4, 1954, Serial No. 408,169

Claims priority, application Germany February 7, 1953

12 Claims. (Cl. 308—187)

The present invention relates to anti-friction bearings which are subjected to axial load and, in particular, is directed to the arrangement of anti-friction means or roller bodies in the cage for such bearings.

It is an object of this invention to provide an improved arrangement of the anti-friction means or roller bodies in the cage for axially-loaded anti-friction bearings, which will considerably improve the running properties of such bearings.

It is another object of this invention to provide anti-friction bearings of the above-mentioned type, in which the pressure at which the anti-friction means or roller bodies are pressed against their contacting surfaces due to the centrifugal force acting upon said roller bodies will be considerably reduced.

It is a still further object of this invention to provide an anti-friction bearing of the above-mentioned character which will make it possible to supply lubricant to those portions of the bearing which are subjected to sliding friction, to such an extent that the running properties of the bearing are considerably improved while the wear of such bearing is materially decreased.

A still further object of this invention consists in the provision of an anti-friction bearing of the above-mentioned character in which the bearings for the anti-friction means or roller bodies will always be supplied with sufficient lubricant irrespective of the direction of rotation of the said antifriction means or roller bodies.

These and other objects and advantages of the invention will appear more clearly from the following specification in connection with the accompanying drawings in which.

General arrangement

According to the present invention, the anti-friction means or roller bodies are journaled in an annular cage or supporting body in such a manner that one of such cages or supporting bodies is arranged on each side of a flange provided on the shaft and adapted to convey the axial load, the arrangement being such that the anti-friction means or roller bodies will roll on one hand on rolling surfaces or race ways of said flange and on the other hand on rolling surfaces or race ways of the casing for the bearing. The invention is based on the finding that, in order to secure a reliable and safe supply of lubricant to those points of the bearing where sliding friction is unavoidable, it is necessary to eliminate the harmful effect of the centrifugal forces occurring during the operation, so that access of the lubricant to the lubricating points is assured at all times. This problem has been solved, according to the present invention, by arranging a plurality of roller bodies upon bolts journaled in an annular supporting body or cage, while bearing or supporting means are interposed between said roller bodies. These bearing or supporting means which may be in the form of rectangular plates are arranged so as to be able to convey to the cage the centrifugal forces which act upon the roller bodies during the rotation of said cage. The arrangement of the said bearing or supporting means between said roller bodies prevents an excessive increase of the pressure at which the roller bodies, due to the effect of the centrifugal forces, are pressed against their contacting surfaces in a direction transverse to the supporting bolts, and in particular prevent the adding up of this pressure the farther the roller bodies of one set are arranged toward the outside in said cage, because each interposed bearing or supporting means intercepts the pressure of the centrifugal force acting on the respective rolling body located inwardly of the respective interposed bearing means.

In addition to the considerable reduction in the sliding friction between the roller bodies and the said interposed bearings or supporting means, the new bearing arrangement according to the present invention also makes it possible unimpededly to supply and convey the lubricant, even at high rotational speeds of the shaft, not only to the above mentioned contacting surfaces but also in a continuous flow to all friction surfaces of the sets of roller bodies. This effect can, according to the present invention, be further improved by a particular arrangement and design of the channel means for the lubricant.

Structural arrangement

Figure 1:
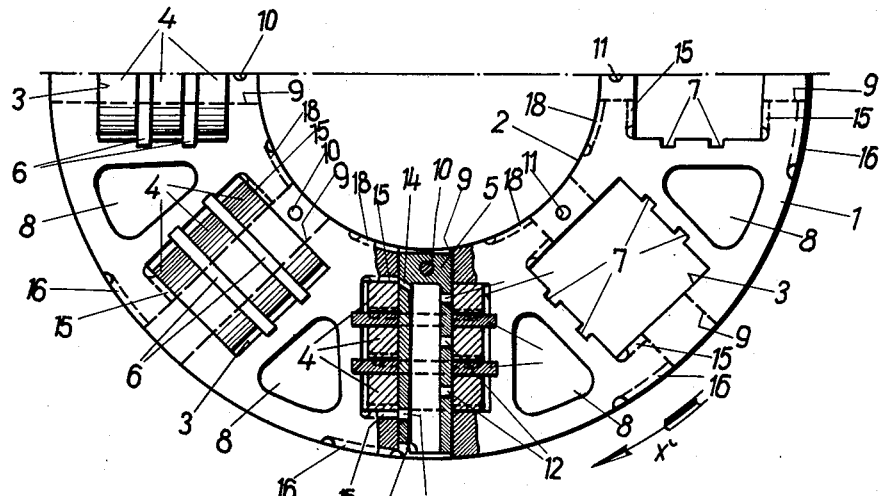
Fig. 1 illustrates a side view partly in section of an arrangement according to the present invention.
Figure 2:
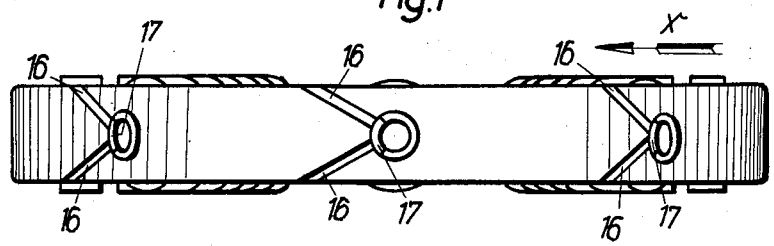
Fig. 2 represents a bottom view of the arrangement shown in Fig. 1.
Figure 3:
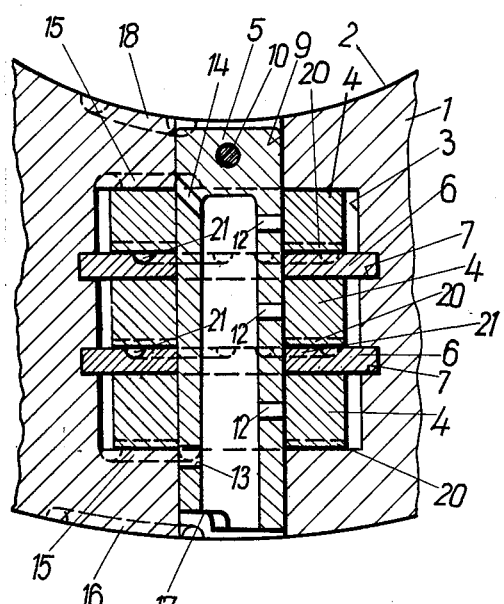
Fig. 3 shows on a somewhat larger scale than that of Figs. 1 and 2 a detail of the arrangement shown in Fig. 1.
Figure 6:
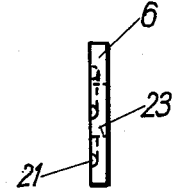
Figure 7:
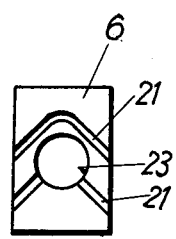

Referring now to the drawing in detail and to Fig. 1 to 7 in particular, the arrangement shown in Fig. 1 represents a disc-shaped annular supporting body or cage 1 (one half only being shown in Fig. 1) which is provided with a central bore 2. The cage 1 is provided with a plurality of rectangular cutouts 3 the axes of which are radially arranged and are evenly angularly spaced from each other. Respectively arranged within said cutouts 3 is a plurality of sets of rollers 4 which are rotatably journaled on hollow bolts 5 and, if desired, are journaled on said hollow bolts with play in axial and radial direction. In order to space the rollers 4 of each set from each other, spacers in form of rectangular supporting plates 6 are interposed between the rollers of each set. These supporting plates 6 are held in grooves 7 which are provided in the cutouts 3 (see also Fig. 7). The width of the cutouts 3 is somewhat greater than the diameter of the rollers 4 so that a play in lateral direction is obtained. The space between the cutouts 3 in the cage 1 is preferably provided with triangular cutouts 8 in order to reduce the weight of the cage 1. The cage 1 is provided with radial bores 9 which are co-axial with the cutouts 3 for receiving the hollow bolts 5. In order to prevent the hollow bolts from moving in longitudinal direction thereof, set pins 10 extend through and are fitted in bores 11 of the hollow bolts 5 and the cage 1 as is clearly shown in the sectioned portion of Fig. 1 and also in Fig. 4. For purposes of conveying oil to the running surfaces of the rollers 4 and to the contacting surfaces of the supporting plates 6, each hollow bolt 5 is provided with bores 12, 13, and 14. These lubricating bores in their turn communicate with correspondingly arranged lubricating grooves 15 in the cutouts 3. The rollers 4 and supporting plates 6 are provided with bores 22 and 23 (Figs. 5 and 7), the inner diameter of which corresponds to the outer diameter of the hollow bolt 5. The front surfaces 19 of the rollers are likewise provided with lubricating grooves 20 which follow a curved path as is clearly shown in Fig. 4. Also one major side of each of the supporting plates 6 is provided with lubricating grooves 21 (Fig. 6). When the supporting body or cage 1 is fully submerged in the lubricating bath and rotates in the direction of the arrow $x$ (Figs. 1 and 2), the required quantity of lubricant passes to the lubricating points in the following manner:

The lubricant passes through the inclined V-shaped grooves 16 which point in the direction of rotation and are arranged in the circumferential surface of the supporting body or cage 1, and is pressed into the hollow chamber of the bolt 5 through a recess 17 in the wall of said bolt. Similarly, lubricant passes into the likewise V-shaped lubricating grooves 15 which also point into the direction of rotation and are provided in the outer wall of the cutouts 3. From here the lubricant passes likewise into the hollow chamber of the bolt through the bore 13 communicating with the grooves 15. The lubricant conveyed into the hollow chamber of the bolt 5 through the above-mentioned grooves 16 and 15 is pressed out of said hollow chamber through the bores 12 in the wall of the bolt and between the outer wall of the bolt and the bore of the rollers 4 which bore slides on the outer wall of the bolt. In this way lubricant reaches those surfaces between which the greater portion of the sliding friction occurs. The lubricant is furthermore pressed through the likewise V-shaped grooves 21 which point in the direction of rotation $x$ and are provided in the plates 6, between the said plates 6 and those surfaces of the roller bodies 4 which are supported by said plates. It will be appreciated that at these points also sliding friction occurs. Through the likewise V-shaped grooves 15 pointing in the direction of rotation $x$ and provided on the inner side of the cutout 3, the lubricant is conveyed either between that wall of the bolt 5 which points in the direction of rotation $x$ and the bore of the roller bodies 4, or in reverse direction the said V-shaped grooves 15 bring about the return of the lubricant from the hollow chamber of the bolt to the lubricant bath. The direction of flow depends on the speed of rotation, i. e., the centrifugal force. In the first instance, due to the effect of the rollers 4, the lubricant flows out of the slot of the cutout 3 and back into the oil bath. While, according to the arrangement shown in Fig. 1, each set of rollers is made up of 3 rollers, it will of course be understood that also more or less than 3 rollers may be arranged in the cutouts 3 depending on the purpose and the dimensions of the bearing.

Figure 4:
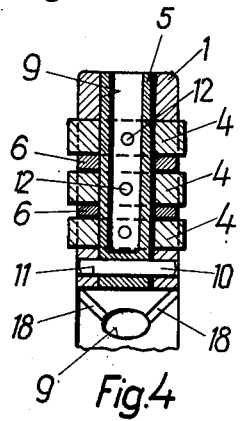
Figs. 4 to 7 illustrate further details of the arrangement shown in Fig. 1.
Figure 5:
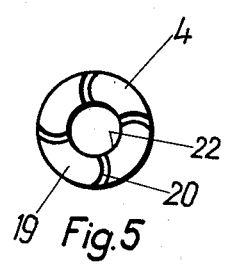

The above-mentioned embodiment of the bearing according to the invention is of particular advantage when the supporting body or cage completely submerges in a lubricant bath in the casing of the bearing. If, however, the lubricant bath covers the cage 1 only partially for instance to such an extent that only the lower parts respectively submerge in the lubricant bath, the hollow bolts 5 are arranged in a manner inverse to that shown in Figs. 1 and 3. In other words, the hollow bolts 5 are so arranged that their open ends point to the inside of the cage. In such an instance, the V-shaped lubricant grooves 16 on the circumference of the cage are eliminated and are replaced by V-shaped grooves 18 on the inner surface of the supporting body or cage 1, as is shown in Fig. 4.

Referring now to the embodiment shown in Figs. 8 to 12, this arrangement is so designed that a sufficient and reliable supply of lubricant will be assured in either direction of rotation of the shaft on which the bearing is mounted. With the exception of the hollow bolts which in the embodiment of Figs. 8 to 12 are designated with the reference numeral 24, all other parts correspond to those of Figs. 1 to 7 and, therefore, are designated with the same reference numerals, however, with the affix $a$.

Figure 8:
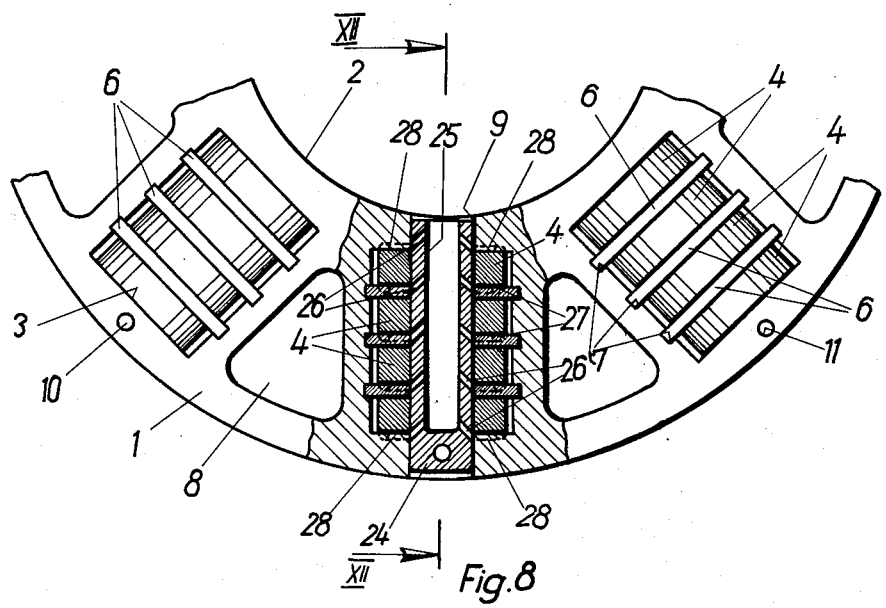
Fig. 8 shows a modified arrangement according to the present invention partly in section.
Figure 9:
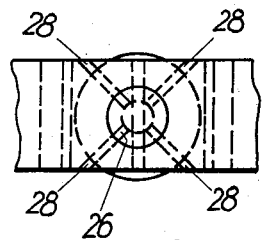
Fig. 9 is a bottom view of a portion of the arrangement of Fig. 8.
Figure 10:
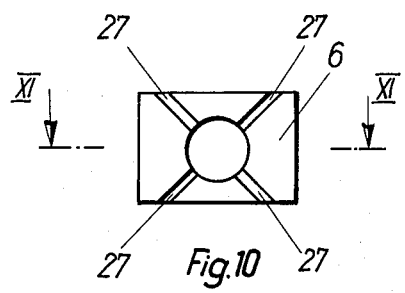
Figs. 10 and 11 illustrate details of the arrangement of Fig. 8.
Figure 11:
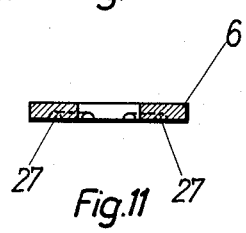
Figure 12:
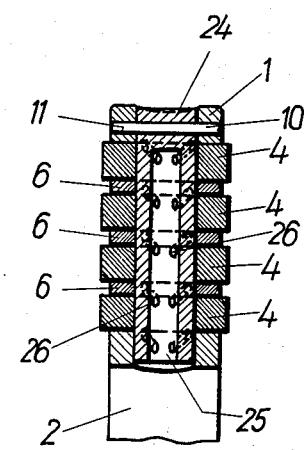
Fig. 12 represents a section taken along the line XII—XII of Fig. 8.

As will be clear from Figs. 8 and 12 the hollow bolts 24 are so arranged that their bores 25 are open toward the bore $2a$ of the supporting body or cage $1a$. Each bore 25 forms channel means for conveying lubricant to the bearing surfaces of the roller body when the cage $1a$ immerges into the lubricant bath of the bearing. In order to allow the lubricant to flow to the proper bearing points of the roller bodies also within those portions of the cage which at the respective time have emerged from the lubricant bath, each hollow bolt 24 is provided with bores 26 which are arranged radially and at an acute angle with regard to the opening of the bore 25, so that on one hand they lead into the bore 25 and on the other hand communicate with crosswise arranged grooves 27 in the supporting plates $6a$, which grooves have their exit at the flanks of the cage $1a$. The bores 26 are arranged in groups of four, in four crosswise intersecting planes, which groups are spaced from each other by a distance corresponding to the distance between the rollers 4 while including the thickness of the supporting plates $6a$. The number of said groups corresponds to the number of said supporting plates $6a$. On the inner and outer front surface of each cutout 3 there are provided grooves 28 similar to the grooves 27 which likewise have their exit at the flanks of the cage $1a$. These grooves 28 have likewise associated therewith corresponding bores 26.

The lubricant required for the proper lubrication will pass to the bearing points of the roller bodies in the following manner:

When the bearing body or cage $1a$ immerges in the lubricant bath of the bearing, those legs of the grooves 27 and 28 in the plates $6a$ and front surfaces of the cutouts $3a$ which point in the respective direction of rotation, act as pressure-producing scooping channels and feed the scooped-up quantities of lubricant through the inclined bores 26 to the bore 25 of the hollow bolt 24 and thus supply the lubricating points with lubricating means.

As soon as the respective section of the supporting body or cage $1a$ emerges from the lubricant bath, the centrifugal force acting upon this quantity of lubricant, becomes effective and causes the said quantity of lubricant to flow along the above-described path through all of the lubricating points back into the lubricant bath. Tests have proved that a continuous circulation of lubricant occurs because always new lubricant flows in a continuous manner to the bearing points of the rollers $4a$ and the supporting plates $6a$. In view of the cross-shaped arrangement of the lubricating grooves according to the present invention (Figures 9 and 10), a reliable lubricating effect is always assured irrespective of whether the shaft carrying the cage or the cage is rotated in clockwise direction or counter-clockwise direction and irrespective of whether or not the cage completely immerges beyond its inner surface or less deeply into the lubricant bath.

It is, of course, understood that the present invention is, by no means, limited to the particular arrangements shown in the drawings but also comprise any modifications within the scope of the appended claims.

I claim:

1. In an anti-friction thrust bearing: an annular rotatable cage, a plurality of sets of rotatable anti-friction means supported by said cage in angularly spaced arrangement, the rotatable anti-friction means of each of said sets being arranged substantially coaxially with regard to each other in radial direction of said cage, a plurality of supporting means respectively interposed between each two adjacent anti-friction means of each of said sets and arranged for engagement with said anti-friction means, each of said interposed supporting means being individually engaged and supported by said cage for intercepting the centrifugal force acting upon the respective adjacent inner anti-friction means during rotation of said cage and for conveying said centrifugal force to said cage.

2. In an anti-friction thrust bearing: an annular rotatable cage, a plurality of radially arranged supporting bolts carried by said cage and substantially evenly angularly spaced from each other, a plurality of sets of rotatable anti-friction bodies rotatable on said bolts, said sets of anti-friction bodies being respectively supported by said supporting bolts, and supporting members respectively interposed between each two adjacent anti-friction bodies of each of said sets, each of said supporting members having outer marginal portions thereof resting in and being prevented by said cage from moving in radial direction with regard to said cage to thereby convey to the latter the centrifugal forces acting on said anti-friction bodies.

3. In an anti-friction thrust bearing: an annular rotatable supporting body having a plurality of radially arranged and substantially evenly angularly spaced cut-outs with grooves therein, a plurality of sets of rotatable anti-friction bodies respectively arranged in said cut-outs, plate shaped spacer means respectively arranged in said grooves and interposed between each two adjacent anti-friction bodies in each of said cut-outs, and a plurality of supporting bolts respectively coaxially arranged with said cut-outs and supported by said supporting body, each of said bolts respectively extending through and supporting the anti-friction bodies and spacer means in the respective cut-out.

4. In an anti-friction thrust bearing: an annular rotatable supporting body, a plurality of radially arranged supporting bolts carried by said supporting body and substantially evenly angularly spaced from each other, each of said supporting bolts being provided with an axial bore, a plurality of sets of rotatable anti-friction bodies respectively supported by said supporting bolts, and spacer means respectively arranged in said supporting body and interposed between each two adjacent anti-friction bodies, said spacer means being provided with channel means communicating with the axial bore of the respective supporting bolt.

5. In an anti-friction thrust bearing: an annular rotatable supporting body, a plurality of radially arranged supporting bolts carried by said supporting body and substantially evenly angularly spaced from each other, each plurality of sets of rotatable anti-friction bodies respectively supported by said supporting bolts, and spacer means respectively arranged in said supporting body and interposed between each two adjacent anti-friction bodies, those sides of said anti-friction bodies engaging the inwardly directed adjacent side of said spacer means being provided with lubricating grooves.

6. In an anti-friction thrust bearing: an annular rotatable supporting body, a plurality of radially arranged supporting bolts carried by said supporting body and substantially evenly angularly spaced from each other, each of said supporting bolts being provided with an axial bore and with additional bores effecting communication between said axial bore and the outer surface of said bolt, a plurality of sets of rotatably mounted rollers respectively supported by said supporting bolts, that side of each of said rollers which is facing in the direction toward the periphery of said annular rotatable supporting body being provided with lubricating grooves communicating with said additional bores, spacer plates interposed between each two adjacent rollers on each of said bolts and supported by said supporting body to convey to said supporting body pressure exerted on said spacer plates by said rollers, said spacer plates being provided with lubricating grooves on that side thereof which faces the grooves of the adjacent roller, the lubricating grooves of said spacer plates also communicating with said additional bores.

7. In an anti-friction thrust bearing: an annular rotatable supporting body having a plurality of radially arranged and substantially evenly angularly spaced cut-outs, a plurality of sets of rotatable anti-friction bodies respectively arranged in said cut-outs, plate shaped spacer means respectively interposed between each two adjacent anti-friction bodies in each of said cut-outs, said spacer means being secured against movement in radial direction, and a plurality of supporting bolts respectively coaxially arranged with said cut-outs and supported by said supporting body, each of said bolts respectively extending through and supporting the anti-friction bodies and spacer means in the respective cut-out and being provided with an axial bore adapted to receive lubricant, each of the two end surfaces of each of said cut-outs being provided with at least one lubricating groove, and each of said bolts being provided with at least one additional bore adjacent each of the respective end surfaces of the respective cut-out for effecting communication between the lubricating grooves at the end surfaces of said cut-outs and the axial bore of the respective bolt.

8. In an anti-friction thrust bearing: a rotatable supporting body having a central bore for receiving a shaft, a plurality of radially arranged supporting bolts carried by said supporting body and substantially evenly angularly spaced from each other, each of said supporting bolts being provided with an axial bore, said supporting body being provided with a plurality of spaced sets of relatively short lubricating grooves arranged in the surface of said central bore and in the outer circumferential surface of said supporting body, the said lubricating grooves of each of said sets being oblique relative to each other so as to form an angle with each other the apex of which is located within the respective adjacent axial bore and the legs of which point in a direction opposite to the direction of rotation of said supporting body, a plurality of sets of rotatable anti-friction bodies respectively supported by said supporting bolts, and spacer means respectively arranged in said supporting body and interposed between each two adjacent anti-friction bodies, said spacer means being provided with channel means communicating with the axial bore of the respective supporting bolt.

9. An anti-friction thrust bearing according to claim 8, in which the axial bores of said supporting bolts are closed toward the periphery of said supporting body and open toward the central bore of said supporting body.

10. In an anti-friction thrust bearing: an annular rotatable supporting body, a plurality of radially arranged supporting bolts carried by said supporting body and substantially evenly angularly spaced from each other, each of said supporting bolts being provided with an axial bore adapted to receive lubricant, a plurality of sets of rotatable anti-friction bodies respectively supported by said supporting bolts, and spacer means respectively arranged in said supporting body and interposed between each two adjacent anti-friction bodies, said spacer means being provided with crosswise arranged lubricating grooves located on that side thereof which faces away from the outer periphery of said supporting body, said cross-wise arranged lubricating grooves communicating with the axial bore of the respective adjacent bolt.

11. In an anti-friction thrust bearing: an annular rotatable supporting body having a plurality of radially arranged and substantially evenly angularly spaced cut-outs, a plurality of sets of rotatable anti-friction bodies respectively arranged in said cut-outs, plate shaped spacer means respectively interposed between each two adjacent anti-friction bodies in each of said cut-outs, said spacer means being secured against movement in radial direction, and a plurality of supporting bolts respectively coaxially arranged with said cut-outs and supported by said supporting body, each of said bolts respectively extending through and supporting the anti-friction bodies and spacer means in the respective cut-out and being provided with an axial bore adapted to receive lubricant, each of the two end surfaces of each of said cut-outs being provided with cross-wise arranged lubricating grooves communicating with the axial bore of the respective adjacent supporting bolt.

12. An anti-friction thrust bearing according to claim 11, in which the supporting bolts are provided with inclined passages leading from the axial bore to the outer periphery of the respective supporting bolt, said inclined passages having their direction of inclination toward the outer periphery of said supporting body.

References Cited in the file of this patent

UNITED STATES PATENTS

| | | |
|---|---|---|
| 717,715 | Ramsey | Jan. 6, 1903 |
| 1,300,385 | Hart | Apr. 15, 1919 |
| 2,219,031 | Frauenthal et al. | Oct. 22, 1940 |
| 2,499,640 | Gamet | Mar. 7, 1950 |

FOREIGN PATENTS

| | | |
|---|---|---|
| 184,405 | Germany | May 16, 1907 |